Aug. 14, 1956

T. H. WIANCKO 2,759,157

ANGULAR ACCELEROMETER

Filed Jan. 16, 1953

THOMAS H. WIANCKO,
INVENTOR.

BY
Reed C. Lawlor
ATTORNEY.

Aug. 14, 1956  T. H. WIANCKO  2,759,157
ANGULAR ACCELEROMETER
Filed Jan. 16, 1953.  2 Sheets-Sheet 2

THOMAS H. WIANCKO,
INVENTOR.

BY
Reed b Lawlor
ATTORNEY.

United States Patent Office 2,759,157
Patented Aug. 14, 1956

2,759,157

ANGULAR ACCELEROMETER

Thomas H. Wiancko, Altadena, Calif.

Application January 16, 1953, Serial No. 331,551

12 Claims. (Cl. 336—30)

My invention relates to improvements in accelerometers, particularly improvements in angular accelerometers.

Generally speaking, an angular accelerometer includes an inertia member mounted in a case for rotation about a predetermined axis therein, together with means for detecting relative angular displacement of the inertia member and the case when the case is subjected to angular rotation. Such angular accelerometers are employed, for example, for determining the angular rotation of a body to which it is secured.

It has been observed that when the body is not subjected to angular acceleration about the predetermined axis, nevertheless, spurious indications of such angular acceleration are sometimes produced. I have found, for example, that such spurious indications may appear when the angular accelerometer is rotating at a constant speed about an axis transverse to the aforementioned axis of rotation.

Accordingly, it is an object of my invention to provide an angular accelerometer which is adapted to detect angular rotation about a predetermined rotation axis, but which is insensitive to rotation of the accelerometer about an axis transverse thereto.

Another object of my invention is to provide an accelerometer in which torsional forces are applied to vanes by means of inertial forces acting upon liquid in which the vanes are immersed, and which is arranged to be insensitive to rotation of the accelerometer about an axis transverse to the predetermined rotation axis.

Another object of my invention is to provide an improved means for detecting angular acceleration of an inertia element in the form of a magnetic member.

The foregoing and other objects of my invention will be understood by reference to the accompanying drawings taken in connection with the following description wherein.

Figure 1:
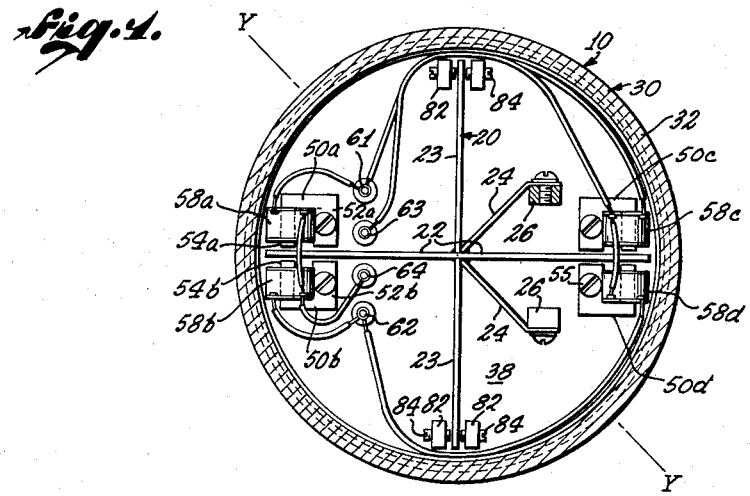
Figure 1 is a cross-sectional view of an embodiment of my improved angular accelerometer taken on the plane 1—1 of Fig. 2.
Figure 2:
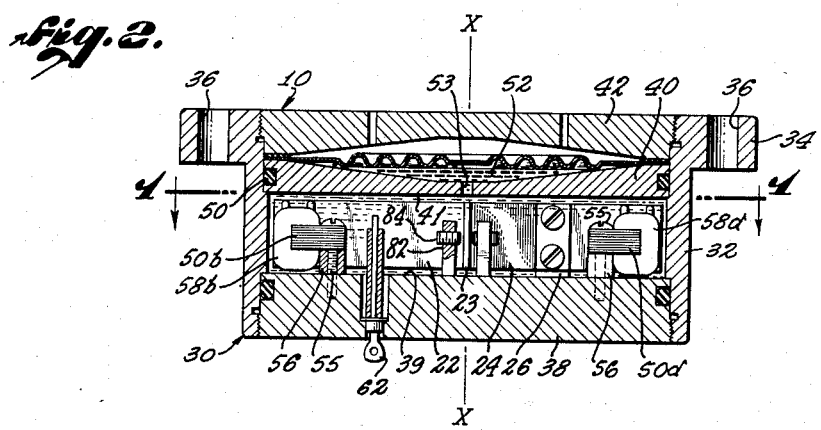
Fig. 2 is a longitudinal cross-sectional view of this angular accelerometer.
Figure 3:
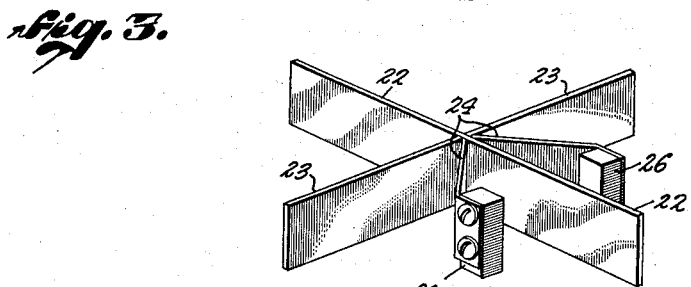
Fig. 3 is a perspective view of the inertia member, together with the springs by which it is resiliently suspended.

Referring to the drawings, and particularly to Figs. 1, 2 and 3, there is illustrated an angular accelerometer 10 embodying the features of my invention. This angular accelerometer comprises a rotatable inertia member 20 resiliently mounted for rotation about the central axis X—X of a cylindrical case 30, together with means for detecting angular displacement of the inertia member 20 relative to the case 30. According to my invention, the inertia member is dynamically balanced about all axes transverse to the rotation axis X—X thereby rendering the accelerometer insensitive to angular acceleration about any axis transverse to the rotation axis X—X, and the center of gravity of the inertia member is located on the rotation axis X—X to render the accelerometer insensitive to linear forces in any direction whatsoever.

The case 30 comprises a cylindrical member 32 having a flange 34 at one end thereof through which pass holes 36 to facilitate attaching the case to an object, the angular acceleration of which is to be measured. The case 30 also comprises a bottom end wall member 38 threadably secured thereto. In addition, an upper wall member consisting of two parts 40 and 42 are secured to the opposite end of the case. The inner faces 39 and 41 of the end wall members are flat and spaced apart in parallel planes, thereby forming a cylindrical cavity within the case 30. O-rings 50 composed of flexible rubber-like material, are squeezed between the sides of the end wall members 38 and 40 and the internal surface of the cylindrical member 32 to form a liquid seal. A body 52 of liquid such as oil fills the cavity formed between the cylindrical member 30 and the faces 39 and 41 of the end wall members.

Ingress and egress of liquid to and from the cavity as required to compensate for changes in volume due to temperature changes, is provided for by means of a small central orifice 52 located at the center of the inner upper wall part 40. The expansion and contraction of the liquid is accomodated by a flexible diaphragm 54 mounted between the two upper wall parts 40 and 42, as described and claimed in my prior Patent No. 2,618,776 that issued November 18, 1952.

The rotatable inertia member 20 of the embodiment of the invention illustrated in Figs. 1 to 3 is non-circular consisting of a pair of coplanar vanes 22 intersecting a second pair of coplanar vanes 23, the four vanes being formed by two intersecting vane members in the form of beams or bars rigidly secured together. The four vanes are of equal length and weight, being elongated and thin, and they are disposed with four-fold symmetry about the central axis X—X thereof. The inertia member 20 is resiliently mounted to rotate about the central axis X—X of the case by means of a pair of leaf springs 24. The inner ends of these springs are suitably secured, such as by soldering or welding, to the inertia member at the axis of rotation. The outer ends of the springs are secured to posts 26 which extend inwardly of the case from the lower end plate 38. The leaf springs 24 constitute a dihedral spring for resiliently suspending the inertia member 20 for rotation about the axis X—X. Such a spring resists rotation about any axis Y—Y transverse to the rotation axis X—X. It will be noted that the springs 24 and the vanes 22 all intersect at the axis of rotation X—X and that the center of gravity of he inertia member is on this axis. Resilient supports of this type are described and claimed in Patent No. 2,618,-776 that issued November 18, 1952.

The edges of the vanes 22, 22, 23, 23 are arranged to be spaced only short distances from the adjacent surfaces of the case, thus impeding the flow of liquid past the vanes. For this reason, the inertia of the oil in which the vanes are immersed increases the effective moment of inertia of the system. In practice, when the angular accelerometer is subjected to angular acceleration, the inertia of the liquid contained in the case creates a differential hydrostatic pressure across the faces of the vanes, causing the vanes to be displaced an amount proportional to this hydrostatic pressure. The inertia of the oil is many times the inertia of the vanes alone, so that this differential pressure is primarily responsible for the torque that displaces the vane against the countertorque established by the dihedral spring. For a given angular acceleration the degree of displacement depends upon the torque constant of the leaf springs 24, 24 that is the restoring torque per unit angular displacement. The spacing between the edges of the vanes and the adjacent surfaces of the case affects the damping of the system. A typical spacing of the edges of the vanes relative to the adjacent walls is about 10% or less of the width of the vanes, that is about 10% or less of the distances between the end wall members 38 and 40. The vanes 22, 22 are composed of soft ferromagnetic material, and the other vanes may be composed of the same material.

The angular displacement of the inertia member 20 relative to the case 30 is detected by means of two pairs of magnetic circuits that include the ends of the two coplanar vanes 22. Thus, at each end of a corresponding vane 22 there is mounted a pair of U-shaped magnetic members 50a and 50b. The two magnetic members are mounted on opposite sides of the adjacent vane 22 with the ends of their legs opposite each other. The inner legs 52a and 52b are somewhat larger than the outer legs 54a and 54b and the inner legs are secured to the lower end wall member 38 by means of screws 55 and spacers 56. Coils 58a and 58b are wound on the outer legs 54a and 54b. Magnetic members 50c and 50d are mounted at the end of the opposite vane, these magnetic members having coils 58c and 58d wound on the outer legs 54c and 54d. The inner legs 52c and 52d of these magnetic members are similarly attached to the end member 58 by means of screws 55 and spacers 58.

Coils 58a and 58c are located at one side of the two coplanar vanes 22, 22 and the coils 58b and 58d are on the other side of the two coplanar vanes. The coils 58a and 58b are connected in series and are so wound that magnetic flux formed in the corresponding U-shaped member passes through the nearby portion of the adjacent vane 22 in opposite directions.

The magnetic members 50a, 50b, 50c and 50d are all in the form of laminations composed of a soft ferromagnetic material. Each of these members forms a magnetic circuit with the adjacent magnetic vane. The reluctance of each of these magnetic circuits and hence the impedance of the respective coils linking those circuits depends upon the position of the inertia member 20 relative to the case 30.

When the inertia member 20 is angularly displaced relative to the case, if it produces an increase in the impedance of one of the coils it produces a corresponding reduction in impedance in the opposite coil. For example, when the inductances of the coils 58a and 58d increase, the inductances of coils 58b and 58c decrease, and vice versa. Use is made of this fact to detect angular acceleration by connecting the junction between coils 58a and 58b to a conductor 63 and the junction between coils 58c and 58d to conductor 62, and the free ends of coils 58a and 58c to conductor 61. All of these conductors are formed at the inner ends of mutually insulated electrical terminals sealed in the lower end wall 58.

It will be noted that posts 82 extending upwardly from the lower end plate 38 are provided with stops in the form of adjusting screws 84 to limit the range of movement of the inertia member. These stops are normally adjusted to prevent the deformation of the dihedral spring 29 from exceeding its elastic limit when the accelerometer is subjected to an unusually large angular acceleration. The conductors connecting the coils 58c and 58d with the terminals 61, 62 and 64 pass around the outer side of the stops in order to avoid interference with the movement of the inertia member 20.

Figure 6:
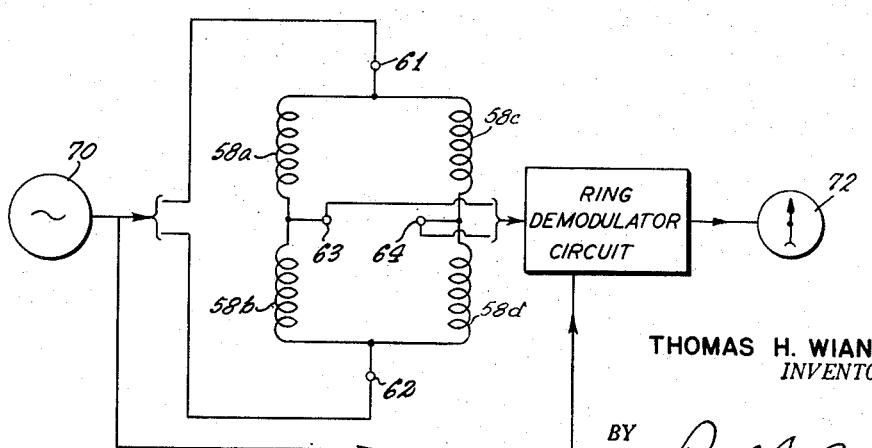
Fig. 6 is a wiring diagram of a circuit employed for measuring and recording angular acceleration.

To utilize the accelerometer for measuring accelera-tion, the four coils 58a, 58b, 58c and 58d are connected in a bridge circuit 68, such as that illustrated in Fig. 6. Alternating current of predetermined frequency, such as 1000 C. P. S., is then applied from a source 70 across terminals 61 and 62. A ring demodulating circuit 71 is connected across the terminals 63 and 64 and a signal from the source 70 is also fed to the ring demodulator without passing through the bridge circuit 68. With this arrangement, when the angular accelerometer is subjected to angular acceleration, the bridge is unbalanced to a degree proportional to the angular acceleration, causing a modulated carrier wave to appear at the output of the bridge circuit, the percentage of modulation being proportional to the acceleration. This modulated carrier wave is combined in the ring demodulator circuit with the unmodulated carrier wave from the source 70 and the demodulated output of the ring demodulator circuit is proportional to the angular acceleration, being positive for accelerations in one direction and negative for accelerations in the opposite direction. The output of the ring demodulator circuit is applied to a recording galvanometer 72 or other current measuring device to indicate the acceleration. If desired, as will be understood by those skilled in the art, the output of the bridge circuit of the ring demodulator circuit may be amplified before or after it is impressed upon the next following circuit.

The accelerometer described is insensitive to rotation about any axis Y—Y transverse to the axis of rotation X—X. The achievement of this insensitivity is due to the employment of the second pair of vanes 23, 23. The employment of this second pair of vanes causes the rotatable member 20 to be dynamically balanced about any such axis Y—Y so that the rotatable member 20 is not displaced relative to the case 30 when the angular accelerometer rotates about such an axis Y—Y.

Such dynamic stability is achieved, in accordance with this invention, when the moment of inertia of the rotatable member 20 is the same about any two different axes in a plane perpendicular to the axis of rotation X—X. In such a case, the moment of inertia is balanced about every axis normal to the axis of rotation. In addition, the center of gravity of the inertia mass is located on the axis of rotation X—X so that the angular accelerometer shall also be insensitive to linear forces in any direction Y—Y transverse to the rotation axis X—X.

Figure 4:
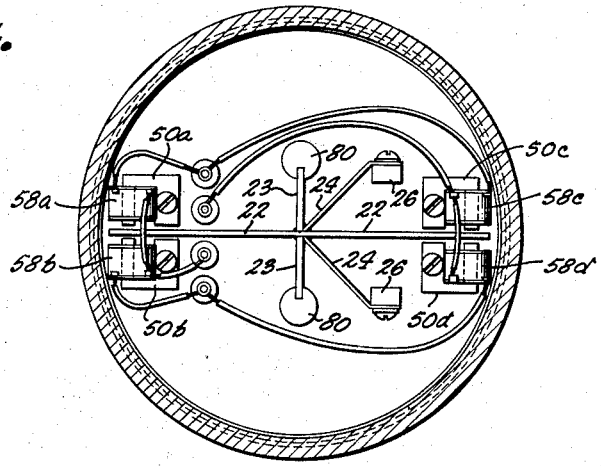
Fig. 4 is a transverse cross-sectional view of an alternative embodiment of the invention.
Figure 5:
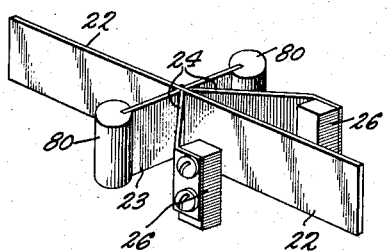
Fig. 5 is a perspective view showing the inertia member and the spring suspension in the alternative embodiment of the invention.

The desired balance may be achieved in many ways. Thus, for example, as shown in Figs. 4 and 5, it is not necessary for the two vanes 23, 23 to have the same length and mass as the two vanes 22, 22. If the vanes 23, 23 are shortened to form short arms as shown in these figures, suitable dynamic balancing of the type required may be achieved by mounting suitable masses 80 at the ends of the vanes. In any event, masses are provided which have a moment of inertia that counterbalances the moment of inertia of the vanes 22, 22 in a plane perpendicular to the axis X—X and the center of gravity is centrally located.

From the foregoing explanation of my invention, it is thus apparent that I have provided an angular accelerometer which is adapted to measure angular acceleration about one predetermined axis free of spurious disturbances that might arise because of rotation of the accelerometer about any other axis transverse to the predetermined rotation axis.

While my invention has been described with particular reference to two forms thereof, it will be obvious that my invention is not limited thereto but is capable of a wide variety of mechanical embodiments. Various changes which will now suggest themselves to those skilled in the art may be made in the material, form, details of construction and arrangement of the elements without departing from the principles of my invention. Reference is therefore made to the appended claims to ascertain the scope of the invention.

I claim:

1. An angular accelerometer comprising: a cylindrical housing comprising a cylindrical side wall member and a pair of end wall members defining a cylindrical cavity containing liquid, a thin elongated vane member resiliently supported in said liquid for rotation about an axis in the plane of said vane member transverse to the length thereof, the edges of said vane member being closely spaced relative to the adjacent wall members to impede the flow of liquid past said edges whereby differential pressures are applied by said liquid across the faces of said vane member when said housing is subjected to angular acceleration about said axis, means including masses disposed on opposite sides of said vane member for dynamically counterbalancing the moment of inertia of said vane member about every axis normal to said rotation axis, and means for detecting angular movement of said vane member relative to said housing.

2. An angular accelerometer comprising: a cylindrical housing, said housing comprising a cylindrical side wall member and a pair of end wall members defining a cylindrical cavity containing liquid, a thin elongated vane member resiliently supported in said liquid for rotation about an axis in the plane of said vane member transverse to its length, the edges of said vane member being closely spaced relative to the adjacent wall members to impede the flow of liquid past said edges whereby differential pressures are applied by said liquid across the faces of said vane member when said housing is subjected to angular acceleration about said axis, arms attached to said vane member at the center thereof, the moment of inertia of said arms dynamically counterbalancing the moment of inertia of said vane member about every axis normal to said rotation axis, and means for detecting angular movement of said vane member relative to said housing.

3. An angular accelerometer comprising: a cylindrical housing, said housing comprising a cylindrical side wall member and a pair of end wall members defining a cylindrical cavity containing liquid, a thin elongated vane member, a pair of leaf springs attached to said vane member adjacent the center thereof for resiliently supporting said vane member in said liquid for rotation about an axis in the plane of said vane member transverse to its length, the edges of said vane member being closely spaced relative to the adjacent wall members to impede the flow of liquid past said edges whereby differential pressures are applied by said liquid across the faces of said vane member when said housing is subjected to angular acceleration, means for dynamically counterbalancing the moment of inertia of said vane member about every axis normal to said rotation axis, and means for detecting angular movement of said vane member relative to said housing.

4. An angular accelerometer comprising: a cylindrical housing, said housing comprising a cylindrical side wall member and a pair of end wall members defining a cylindrical cavity containing liquid, a thin elongated vane member composed of magnetic material, springs resiliently supporting said vane member in said liquid for rotation about an axis in the plane of said vane member transverse to its length, the edges of said vane member being closely spaced relative to the adjacent wall members to impede the flow of liquid past said edges whereby differential pressures are applied by said liquid across the faces of said vane member when said housing is subjected to angular acceleration about said axis, arms attached to said vane member at the center thereof, the moment of inertia of said arms dynamically counterbalancing the moment of inertia of said vane member about every axis normal to said rotation axis, and means including a pair of magnetic elements forming magnetic circuits with said vane member at each end thereof for detecting angular movement of said vane member relative to said housing.

5. An angular accelerometer comprising: a cylindrical housing containing liquid, said housing comprising a cylindrical side wall member and a pair of spaced apart transverse wall members, a plurality of vanes resiliently mounted for rotation about the axis of said housing, the edges of said vanes being closely spaced relative to the adjacent wall members for impeding the flow of liquid past said vanes, whereby differential pressures are applied by said liquid across the faces of said vanes when said housing is subjected to angular acceleration, the mass of said vanes being dynamically balanced about every axis normal to said rotation axis, and means for detecting angular movement of said vanes relative to said housing.

6. An angular accelerometer comprising: a cylindrical housing containing liquid, said housing comprising a cylindrical side wall member and a pair of spaced apart transverse wall members, a rigid body comprising a plurality of vanes radially extending from the central axis thereof, means resiliently mounting said body in said housing for rotation about the axis of said housing, the edges of said vanes being closely spaced relative to the adjacent wall members to impede the flow of liquid past said vanes whereby differential pressures are applied by said liquid across the faces of said vanes when said housing is subjected to angular acceleration, the mass of said vanes being dynamically balanced about every axis normal to said rotation axis, and means for detecting angular movement of said body relative to said housing.

7. An angular accelerometer comprising: a cylindrical housing containing liquid, said housing comprising a cylindrical side wall member and a pair of end wall members, a rotatable member immersed in said liquid, said member consisting of a unitary rigid body consisting of two beams crossing at a central axis, a pair of leaf springs attached to said beams adjacent said central axis for resiliently mounting said rotatable member in said housing for rotation about said axis, the mass of said rotatable member being dynamically balanced about every axis normal to said rotation axis, and means for detecting angular movement of said beams relative to said housing.

8. An angular accelerometer as defined in claim 7 comprising means for limiting the range of angular rotation of said beams.

9. An angular accelerometer comprising: a support member, a rotatable member consisting of a rigid body resiliently mounted on said support member for rotation about a predetermined rotation axis, the mass of said rotatable member being dynamically balanced about every axis normal to said rotation axis, and means for detecting relative angular movement of said rotatable member and said support member.

10. An angular accelerometer comprising: a support member, a rotatable member consisting of a rigid body resiliently mounted on said support member for rotation about a predetermined rotation axis, said body being of non-circular cross-section about said rotation axis, the mass of said rotatable member being dynamically balanced about every axis normal to said rotation axis, and means for detecting relative angular movement of said rotatable member and said support member.

11. An angular accelerometer comprising: a support member, a rotatable member consisting of a rigid body, the mass of said rotatable member being dynamically balanced about every axis normal to a predetermined rotation axis, said body being of non-circular cross-section about said rotation axis, means including a spring member connected to said rotatable member adjacent said rotation axis for resiliently mounting said rotatable member on said support member for rotation about said rotation axis, and means for detecting relative angular movement of said rotatable member and said support member.

12. An angular accelerometer comprising: a support member, a rotatable member consisting of a rigid body consisting of two beams crossing at a central axis, a pair of leaf springs attached to said beams adjacent said central axis for resiliently mounting said rotatable member on said support member for rotation about said axis, the mass of said rotatable member being dynamically balanced about every axis normal to said rotation axis, and means for detecting relative angular movement of said beams and said support member.

References Cited in the file of this patent

UNITED STATES PATENTS

| | | |
|---|---|---|
| 2,457,165 | McNamee | Dec. 28, 1948 |
| 2,535,108 | Warshawsky | Dec. 26, 1950 |
| 2,552,722 | King | May 15, 1951 |
| 2,618,776 | Wiancko | Nov. 18, 1952 |
| 2,643,869 | Clark | June 30, 1953 |
| 2,683,596 | Morrow | July 13, 1954 |